May 1, 1923.
E. F. WATERBOR
VEHICLE WHEEL
Filed Feb. 8, 1919
1,453,371
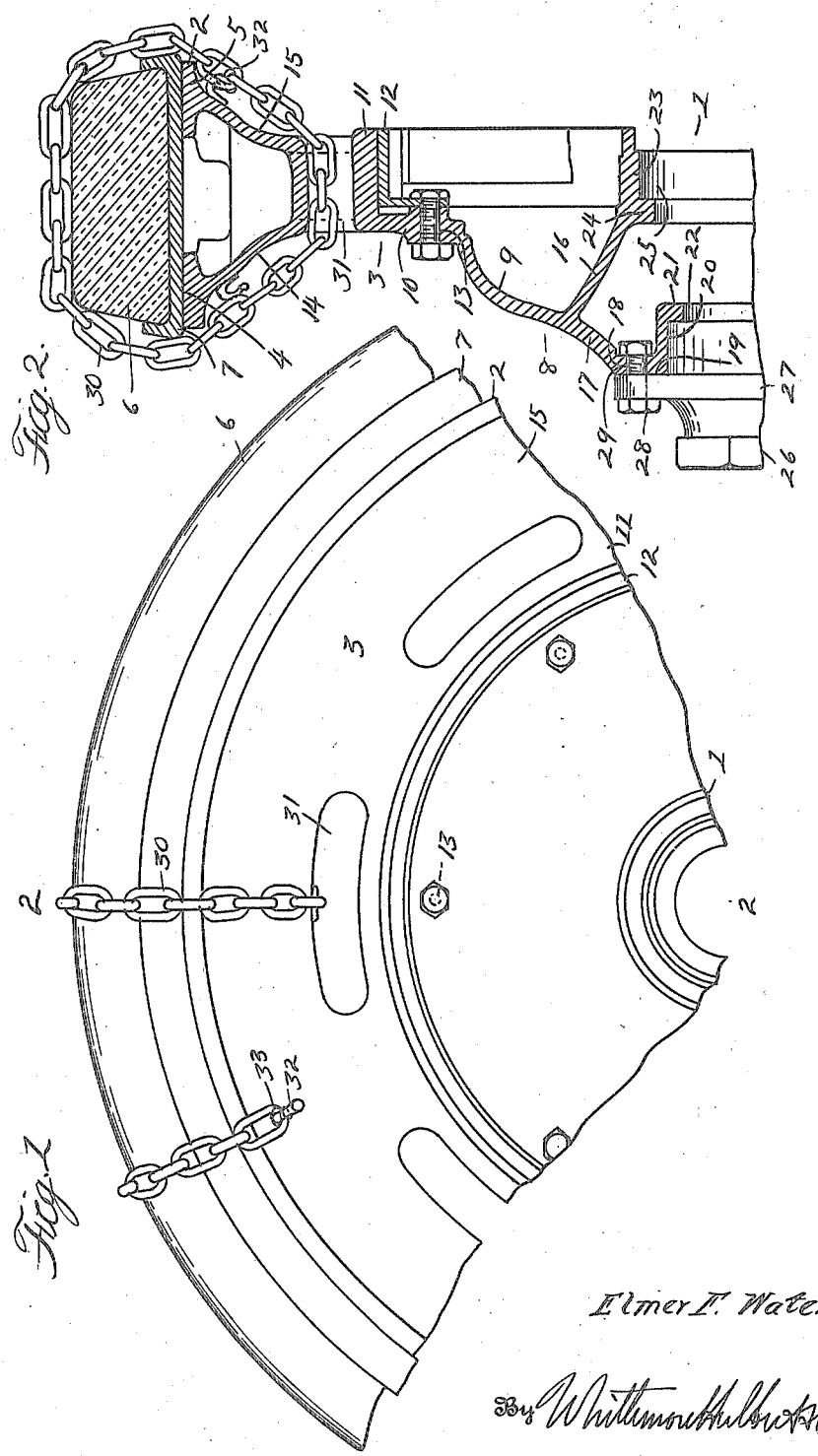
Inventor
Elmer F. Waterbor Patented May 1, 1923.

1,453,371

UNITED STATES PATENT OFFICE.

ELMER F. WATERBOR, OF DETROIT, MICHIGAN, ASSIGNOR TO MICHIGAN MALLEABLE IRON COMPANY, OF DETROIT, MICHIGAN, A CORPORATION OF MICHIGAN.

VEHICLE WHEEL.

Application filed February 8, 1919. Serial No. 275,704.

*To all whom it may concern:*

Be it known that I, ELMER F. WATERBOR, a citizen of the United States of America, residing at Detroit, in the county of Wayne and State of Michigan, have invented certain new and useful Improvements in Vehicle Wheels, of which the following is a specification, reference being had therein to the accompanying drawing.

The invention relates to vehicle wheels of the cast metal type and has for one of its objects the provision of a construction which is very strong and which may be readily and easily cast. The invention has for another object the provision of a construction in which the hub has a plane or flat end face against which the hub cap is secured and further has a strong flange portion for engaging an anti-friction bearing. Other objects of the invention reside in the novel arrangements and combinations of parts as more fully hereinafter set forth.

In the drawings:

Figure 1 is a side elevation of a portion of a vehicle wheel embodying my invention;

Figure 2 is a cross section on the line 2—2 of Figure 1.

The vehicle wheel comprises the hub 1, the peripheral bearing portion 2, and the intermediate web portion 3. The bearing portion 2 comprises the spaced bearings 4 and 5 which are adapted to support the tire 6. As shown, the tire has the rim 7 which engages the bearings. The web portion 3 comprises the radial web 8 extending outward from the hub 1 and this web has the curved portion 9 inclined relative to the plane of rotation of the wheel and the portion 10 parallel to said plane. 11 is a transversely extending annular flange on the inner side of the portion 10 and integral therewith. Suitable gearing 12 is provided in the space inside the annular flange, this gearing being secured to the wheel by suitable securing means passing through the series of holes 13 in the portion 10 of the web. The web portion 3 also comprises the spaced radial webs 14 and 15 integral with the web 8 and flaring outwardly. These spaced webs are secured to the annular flange 11 near its edges and terminate in the bearings 4 and 5, the web 14 being in continuation of the portion 10 of the web 8.

The hub 1 is formed by the converging walls 16 and 17 which are inclined outward toward each other from the ends of the hub. The wall 17 is in continuation of the inclined portion 9 of the web 8 and has the portion 18 extending transversely of the axis of the hub and forming a plane or flat face 19 at the outer end of the hub and also has the inwardly-extending flange 20 with the annlar projection 21 at its end for engaging the anti-friction bearing 22. The wall 16 has the portion 23 near its end and the projection 24 for engaging the anti-friction bearing 25. 26 is a hub cap which has the flange 27 adapted to rest against the flat or plane face 19 and be secured thereto by suitable means, such as the series of bolts 28 passing through the holes 29 in the portion 18 of the hub.

For the purpose of obtaining good traction for the wheels, the chains 30 are provided extending around the tire 6 and passing through the apertures 31 in the webs 14 and 15 adjacent to the annular flange 11 and secured to the wheel by having their ends secured together. These chains may also engage the hooks 32 on the webs 14 and 15 intermediate the apertures and be secured by suitable means such as the wires 33.

From the above description it will be readily seen that I have provided a strong construction of wheel, due to the fact the stresses upon tire-supporting portion 2 are carried through the two spaced webs 14 and 15 which at their inner edges are connected to the annular flange 11 upon the web 8, which flange distributes the stresses and transmits the same to the web 8 and then to the hub 1. Due to the web 8 being curved or bowed, it more easily carries the stresses. Due to the arrangement of the walls of the hub in which they incline towards each other from the ends of the hub, the latter is greatly strengthened. Furthermore, by forming one of the hub walls with a portion extending transversely of the axis of the hub and with an inwardly-extending portion for engaging an anti-friction bearing, a strong construction of hub is provided. Another decided advantage is that the wheel may be easily cast since there are no grooves in the outer face of the hub 1. Furthermore, a simple arrangement is provided for securing the hub cap to the wheel.

What I claim as my invention is:

1. In a vehicle wheel, the combination with a hub, of a web extending from said hub, said web being fashioned to engage one side of a gear ring, an annular flange extending from said web and surrounding said gear ring, spaced bearings for supporting a tire rim, and connections between said bearings and flange.

2. In a vehicle wheel, the combination with a hub, of a web extending from said hub, said web having a portion extending parallel to the plane of rotation of said wheel, a gear ring secured to said portion, an annular flange extending from said portion and surrounding said gear ring, spaced bearings for supporting a tire rim, and connections between said bearings and flange.

In testimony whereof I affix my signature.

ELMER F. WATERBOR.